(12) United States Patent
Minamino

(10) Patent No.: US 9,572,183 B2
(45) Date of Patent: Feb. 14, 2017

(54) WIRELESS COMMUNICATION APPARATUS, PROGRAM, AND COMMUNICATION CONTROL METHOD

(71) Applicant: SONY CORPORATION, Tokyo (JP)

(72) Inventor: Takanori Minamino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/366,502

(22) PCT Filed: Dec. 14, 2012

(86) PCT No.: PCT/JP2012/082517
§ 371 (c)(1),
(2) Date: Jun. 18, 2014

(87) PCT Pub. No.: WO2013/121670
PCT Pub. Date: Aug. 22, 2013

(65) Prior Publication Data
US 2015/0036521 A1 Feb. 5, 2015

(30) Foreign Application Priority Data
Feb. 16, 2012 (JP) ................. 2012-031459

(51) Int. Cl.
| H04W 76/02 | (2009.01) |
| H04W 24/08 | (2009.01) |
| H04W 48/16 | (2009.01) |
| H04W 48/20 | (2009.01) |
| H04W 84/12 | (2009.01) |

(52) U.S. Cl.
CPC ............. *H04W 76/02* (2013.01); *H04W 24/08* (2013.01); *H04W 48/16* (2013.01); *H04W 48/20* (2013.01); *H04W 84/12* (2013.01)

(58) Field of Classification Search
CPC ...... H04W 84/00; H04W 84/12; H04W 36/08; H04W 36/24; H04W 36/26; H04W 36/30; H04W 36/32; H04W 88/08; H04W 64/00; H04W 48/04; H04W 48/06; H04W 48/20
See application file for complete search history.

(56) References Cited

U.S. PATENT DOCUMENTS

| 8,331,335 B2 * | 12/2012 | Chhabra ........................ 370/338 |
| 2007/0066304 A1 * | 3/2007 | Lee ................. 455/436 |
| 2007/0268877 A1 * | 11/2007 | Buckley et al. .............. 370/338 |

(Continued)

FOREIGN PATENT DOCUMENTS

| JP | 2005-20198 A | 1/2005 |
| JP | 2010-508740 A | 3/2010 |
| JP | 2010-206543 A | 9/2010 |

*Primary Examiner* — Curtis A Alia
(74) *Attorney, Agent, or Firm* — Chip Law Group

(57) ABSTRACT

There is provided a wireless communication apparatus including an obtaining unit configured to obtain parameter information, and a communication control unit configured to prioritize and select another wireless communication apparatus included in a connection history as a connection when a difference between the parameter information during a connection with another wireless communication apparatus included in the connection history and the parameter information obtained by the obtaining unit when not connected to the other wireless communication apparatus is at or less than a predetermined value.

9 Claims, 10 Drawing Sheets

(56) References Cited

U.S. PATENT DOCUMENTS

| | | | | |
|---|---|---|---|---|
| 2008/0070563 A1* | 3/2008 | Adya | .................... | H04W 12/12 |
| | | | | 455/422.1 |
| 2008/0108396 A1 | 5/2008 | Lundqvist | | |
| 2009/0161639 A1* | 6/2009 | Ostergren | ............ | H04W 48/16 |
| | | | | 370/338 |
| 2010/0128698 A1* | 5/2010 | Ishizu | .................. | H04W 48/20 |
| | | | | 370/332 |
| 2010/0157067 A1* | 6/2010 | Karn et al. | ................. | 348/207.1 |
| 2011/0249622 A1* | 10/2011 | Takeda | ................. | H04W 48/20 |
| | | | | 370/328 |
| 2011/0257923 A1* | 10/2011 | Boulton | ................ | G01S 5/0221 |
| | | | | 702/117 |
| 2011/0286437 A1* | 11/2011 | Austin | .................... | H04W 4/02 |
| | | | | 370/338 |
| 2012/0157115 A1* | 6/2012 | Jeong | ................... | H04W 24/02 |
| | | | | 455/456.1 |
| 2013/0182697 A1* | 7/2013 | Tuominen | ............ | G01S 5/0242 |
| | | | | 370/338 |

\* cited by examiner

WIRELESS COMMUNICATION APPARATUS, PROGRAM, AND COMMUNICATION CONTROL METHOD

TECHNICAL FIELD

The present disclosure relates to a wireless communication apparatus, program, and communication control method.

BACKGROUND ART

Well-known mobile communication systems in which a mobile communication terminal apparatus performs transceiving with a fixed base station apparatus include a wireless LAN system in which a communication terminal apparatus searches for and discovers a base station apparatus present in the near vicinity, and then connects to a network via the base station apparatus after setting communication conditions.

The aforementioned communication terminal apparatus is, for example, a cellular phone, mobile computer, and performs wireless communication with the discovered base station apparatus (also referred to as an access point). If multiple access points (hereinafter, referred to as APs) are discovered, the communication terminal apparatus may select and connect with an AP on the basis of a static AP priority or radio quality such as radio wave strength.

Specifically, a method is proposed in which a radio quality threshold is set for each connection (AP) along with a predetermined priority, for example, and then the connection is determined from among the APs that exceed the radio quality threshold according to their priority.

According to Patent Literature 1, a method is proposed in which priority for the connection is determined on the basis of a connection history, and a connection is made in accordance with the priority. In addition, according to Patent Literature 1, a method is proposed in which a user may manually change the priority if the priority for the connection is not in line with a user's intention.

CITATION LIST

Patent Literature

Patent Literature 1: JP 2010-206543A

SUMMARY OF INVENTION

Technical Problem

However, according to the method to determine connections on the basis of a threshold of the aforementioned radio quality, there is a high probability that a connection is made with an AP not intended by the user.

Conversely, according to the method disclosed in Patent Literature 1, if selection of the connecting AP occurs again after the connection is disconnected, a connection is made with the previously connected AP, which is the AP intended by the user, but this creates a situation (problem) in which a connection is not made with an AP that has a higher radio quality even if present.

Thus, according to the present disclosure, a new and improved wireless communication apparatus, program, and communication control method is provided that is capable of selecting connections on the basis of dynamic criteria in accordance with circumstances.

Solution to Problem

According to the present disclosure, there is provided a wireless communication apparatus including an obtaining unit configured to obtain parameter information, and a communication control unit configured to prioritize and select another wireless communication apparatus included in a connection history as a connection when a difference between the parameter information during a connection with another wireless communication apparatus included in the connection history and the parameter information obtained by the obtaining unit when not connected to the other wireless communication apparatus is at or less than a predetermined value.

According to the present disclosure, there is provided a program for causing a computer to function as an obtaining unit configured to obtain parameter information, and a communication control unit configured to prioritize and select another wireless communication apparatus included in a connection history as a connection when a difference between the parameter information during a connection with another wireless communication apparatus included in the connection history and the parameter information obtained by the obtaining unit when not connected to the other wireless communication apparatus is at or less than a predetermined value.

According to the present disclosure, there is provided a communication control method including obtaining parameter information, and prioritizing and selecting another wireless communication apparatus included in a connection history as a connection when a difference between the parameter information during a connection with another wireless communication apparatus included in the connection history and the parameter information obtained by an obtaining unit when not connected to the other wireless communication apparatus is at or less than a predetermined value.

Advantageous Effects of Invention

According to the present disclosure as previously described, connections may be selected on the basis of dynamic criteria in accordance with circumstances.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In this specification and the drawings, configuration elements that have substantially the same function and structure may be denoted with the same reference signs followed by different letters of the alphabet after to distinguish between them. However, configuration elements that have substantially the same function and structure that do not particularly have to be differentiated are denoted with the same reference signs only.

The description will progress in the order below.
1. Overview of a communication system according to an embodiment of the present disclosure
2. The Embodiments
2-1. First Embodiment
2-1-1. Configuration of Imaging Apparatus
2-1-2. Connection Selection
2-2. Second Embodiment
3. Summary

Figure 1:
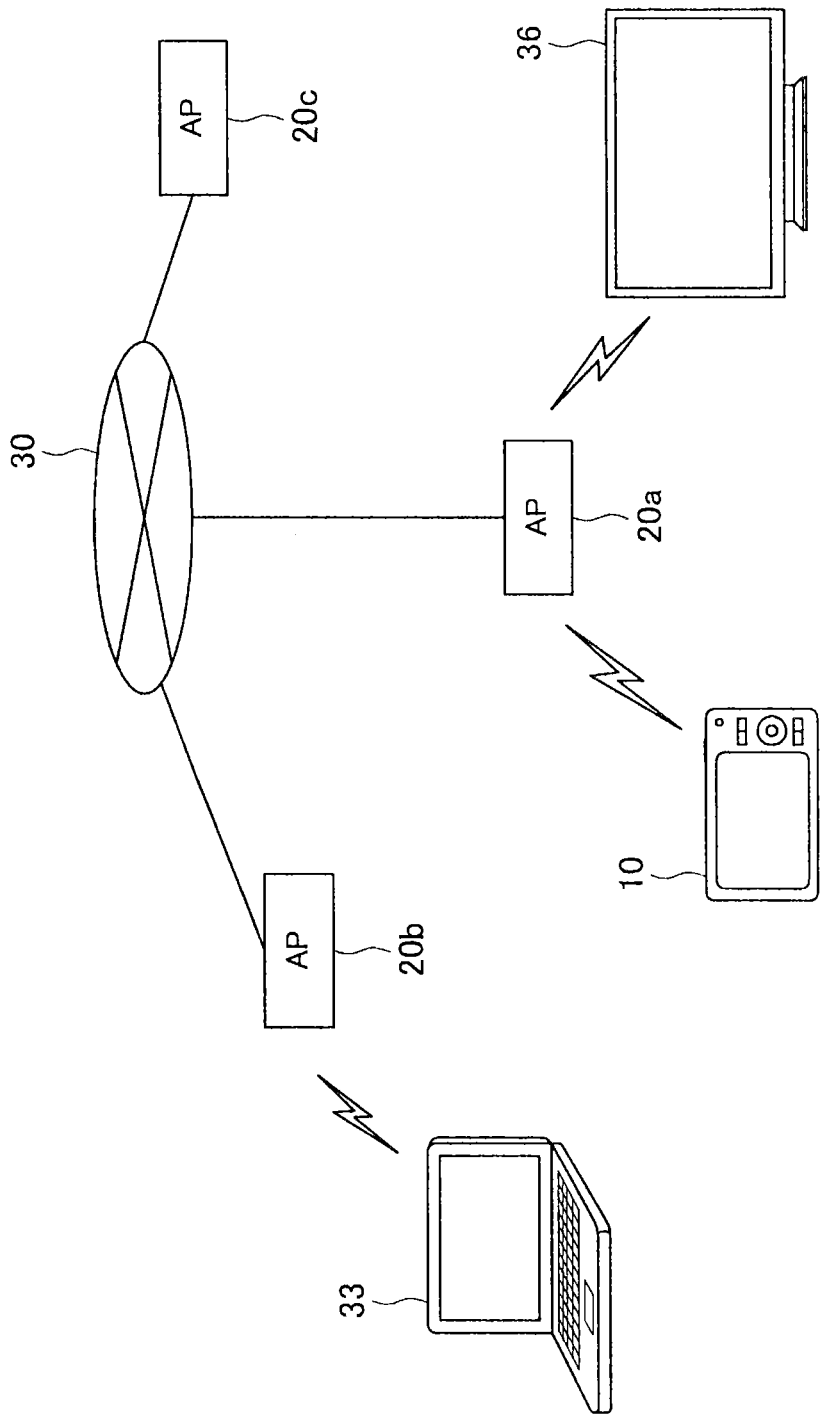
FIG. 1 is a diagram describing an overview of a communication system according to an embodiment of the present disclosure.

1. Overview of a Communication System According to an Embodiment of the Present Disclosure First, an overview of a communication system according to an embodiment of the present disclosure will be described with reference to FIG. 1. As illustrated in FIG. 1, according to the communication system regarding an embodiment of the present disclosure, multiple access points (APs) 20a through 20c are connected to a network 30. Each of the APs 20a through 20c are connected to wireless communication apparatuses such as an imaging apparatus 10, a laptop computer 33, and a television 36.

Regarding such a communication system, the imaging apparatus 10 according to the present embodiment searches for the AP 20 present in the near vicinity, and then discovers and connects with the AP 20. As a result, the imaging apparatus 10 may send captured images directly to a server (not illustrated) on the network 30 or other communication apparatuses connected to the AP 20 (the home television 36 as an example shown in FIG. 1).

Recently, the use of a wireless LAN based on certified standards of interoperability known as Wi-Fi is widespread. The imaging apparatus 10 according to the aforementioned present embodiment may use Wi-H to send captured images.

As the normal method to determine the Wi-Fi connection and as previously described, there is a method to make determinations depending on priority based on connection history or a static AP priority registered by the user, and there is a method to make determinations in accordance with radio quality such as radio wave strength.

However, according to such a determining method, there is a potential that a device that is disconnected from a Wi-Fi network unintentionally due to the state of the apparatus will not be able to reconnect with the AP intended by the user. Particularly with regard to home networks in which the network is different depending on the connecting AP, there are many cases in which the user wants to reliably connect with the desired AP.

Regarding the apparatus disconnected from the Wi-Fi network due to the state of the apparatus, the imaging apparatus 10 equipped with a Wi-Fi function, for example, may not be able to use the imaging function and the Wi-Fi function simultaneously due to power consumption or CPU load restrictions. The relationship between state transitions of such an imaging apparatus 10 and the on/off state of Wi-Fi will be described with reference to FIG. 2.

Figure 2:
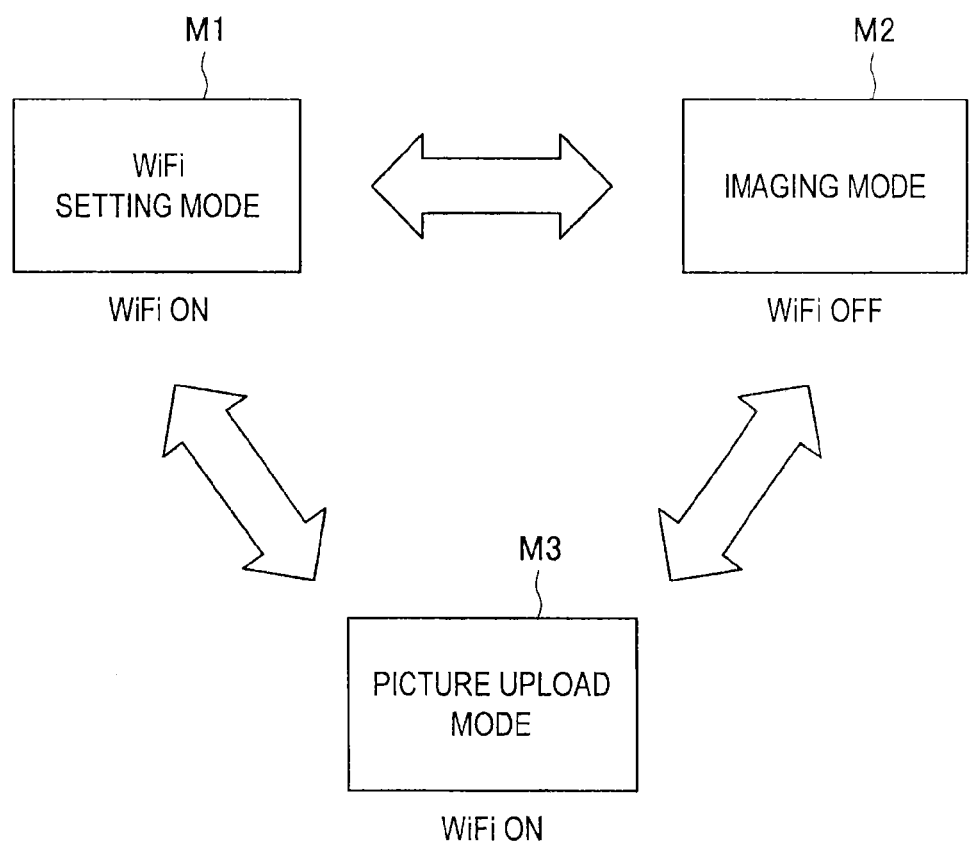
FIG. 2 is a state transition diagram describing a relationship between operation modes of an imaging apparatus and Wi-Fi status (ON/OFF).

FIG. 2 is a state transition diagram describing a relationship between operation modes of the imaging apparatus 10 and Wi-Fi status (ON/OFF). As shown in FIG. 2, the example describes a case in which the imaging apparatus 10 transitions to a Wi-Fi setting mode M1, an imaging mode M2, and a picture upload mode M3 from among the multiple operation modes available. The Wi-Fi setting mode M1 is the mode that performs the setting of the connecting AP. In addition, the imaging mode M2 is mode that performs imaging of a photographic subject. In addition, the picture upload mode M3 is the mode that performs transmission of captured images using Wi-Fi.

As illustrated in FIG. 2, when the operation mode of the imaging apparatus 10 is the Wi-Fi setting mode M1, for example, Wi-Fi is on, and the imaging apparatus 10 connects to the AP 20. When the operation mode of the imaging apparatus 10 transitions from the Wi-Fi setting mode M1 to the picture upload mode M3, Wi-Fi remains on, and the imaging apparatus 10 may send captured images to the AP 20.

Conversely, as illustrated in FIG. 2, if the operation mode of the imaging apparatus 10 transitions from the Wi-Fi setting mode M1 to the imaging mode M2 (imaging unit starts up), Wi-Fi turns off, and the connection with the AP 20 is disconnected. Next, as illustrated in FIG. 2, if the operation mode of the imaging apparatus 10 transitions from the imaging mode M2 to the picture upload mode M3, Wi-Fi turns on, and the imaging apparatus 10 is connected to the AP 20.

The imaging apparatus 10 is again connected to the AP 20, and according the aforementioned determining method, there is a high probability that a connection may not be made with the specific AP 20 as intended by the user. For example, after the AP 20a is determined as the connection during the Wi-Fi setting mode M1 of the imaging apparatus 10, the connection with the AP 20a is disconnected if transitioning to the imaging mode M2 to perform imaging.

Afterwards, when transitioning to the picture upload mode M3 to send captured images to the TV 36, the imaging apparatus 10 has to reconnect to the AP 20a, but this is difficult to implement according to the determining method based on radio quality as previously described.

As another determining method, the user may set the priority for the connection, but manual configuration is complicated, and if the user wants to connect to a different AP, it takes time for the user to reconfigure settings. According to a determining method in which the connection history is prioritized into a new order (order from the most recently connected AP), the imaging apparatus 10 is able to reconnect with the AP 20a, but this creates a situation in which connections are not made with other APs present despite having better radio quality.

The imaging apparatus 10 according to the present embodiment may select the connection on the basis of dynamic criteria in accordance with circumstances by selecting a connection in accordance with the connection history or other criteria depending on a difference in parameter information when connected to the AP 20 and parameter information when not connected. According to the present specification, the parameter information when connected to the AP 20 may be parameter information regarding the start time of the connection with the AP 20, the end time of the connection, or during the connection.

As a result, the imaging apparatus 10 may reconnect with the AP 20a for which Wi-Fi settings have been performed, and may prevent continuous reconnections with the AP 20a when the radio wave strength is weak such as after a certain amount of time has elapsed or at least a certain distance has been traveled.

This concludes the description of the overview of the communication system according to an embodiment of the present disclosure. Next, the embodiments of the present disclosure will be described in detail. FIG. 1 illustrates the imaging apparatus 10 as an example of a wireless communication apparatus according to an embodiment of the present disclosure, but the wireless communication apparatus according to the present embodiment is not limited thusly. The wireless communication apparatus may be, for example, a laptop computer, smartphone, personal digital assistant (PDA), cellular phone, portable music playing apparatus, portable video processing apparatus, or a portable game machine. According to the present disclosure, the AP 20 is used as an example of another wireless communication apparatus, which is the connection for the imaging apparatus 10. The connection for the imaging apparatus 10 may be another AP, or a client terminal supporting Wi-Fi Direct, for example.

2. The Embodiments

2-1. First Embodiment

The configuration and operational processing of the imaging apparatus 10 according to the First Embodiment will be described in detail with reference to FIG. 3 through 8.

2-1-1. Configuration of Imaging Apparatus

Figure 3:
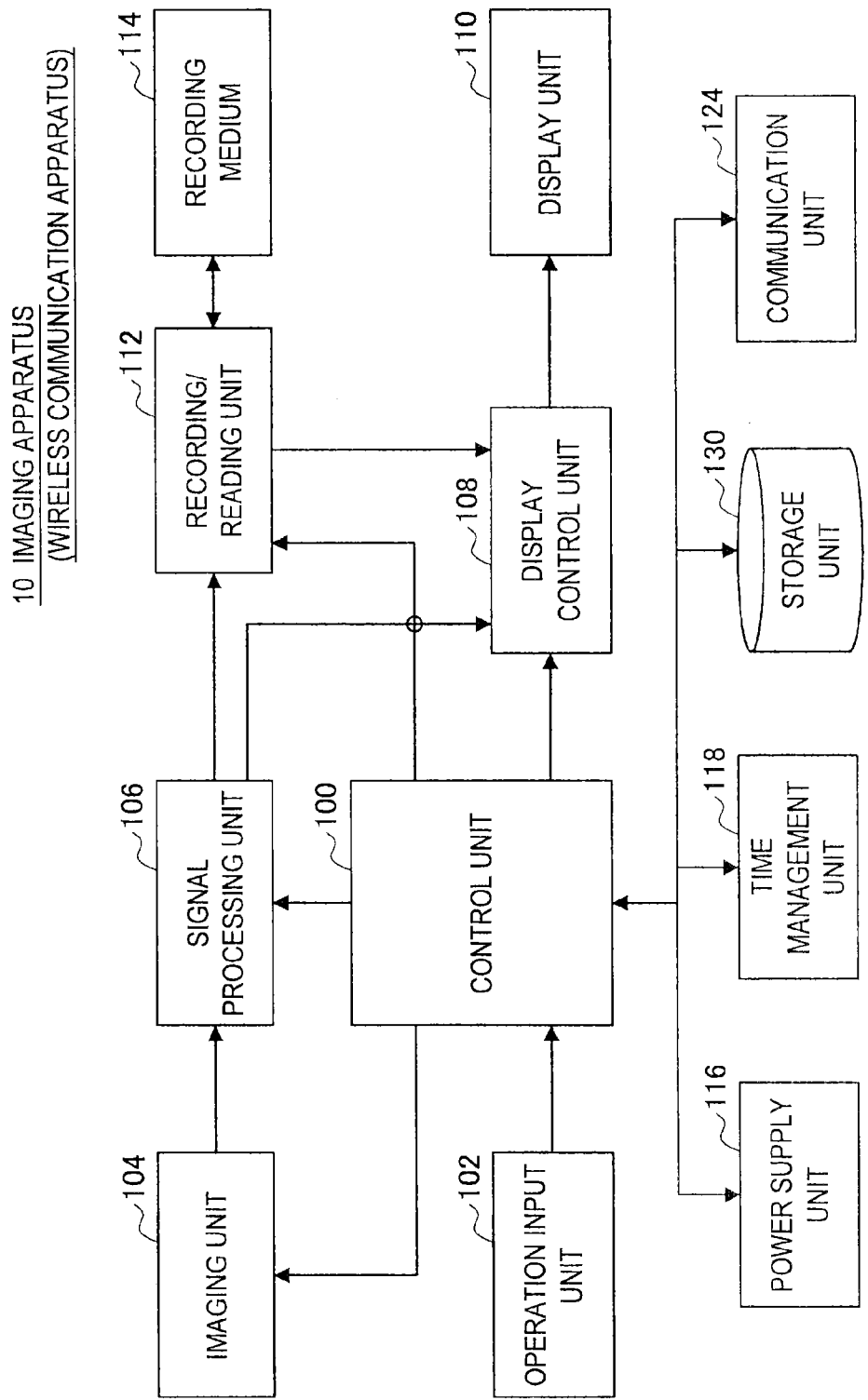
FIG. 3 is a block diagram illustrating a configuration of an imaging apparatus according to a First Embodiment.

FIG. 3 is a block diagram illustrating a configuration of the imaging apparatus 10 according to the First Embodiment. As illustrated in FIG. 3, the imaging apparatus 10 according to the present embodiment, includes a control unit 100, an operational input unit 102, an imaging unit 104, a signal processing unit 106, a display control unit 108, a display unit 110, a recording/reading unit 112, a recording medium 114, a power supply unit 116, a time management unit 118, a storage unit 130, and a communication unit 124.

The control unit 100 controls the various configurations in the imaging apparatus 10. As illustrated in FIG. 3, for example, the control unit 100 outputs control signals in accordance with operational signals output from the operational input unit 102 to the various configurations to execute imaging control, signal processing control, recording control, display control, and so on. The control unit 100 according to the present embodiment also functions as a communication control unit to control the communication unit 124 and performs selection of the connecting AP. Selection of the connecting AP according to the present embodiment will be described in detail in section "2-1-2. Connection Selection".

The operational input unit 102 detects operational input from the user and outputs this as an operational signal to the control unit 100. The operational input unit 102 may have a physical configuration of buttons (shutter button, mode switch, menu button, operational lever, etc.), or may be a touch panel which is installed by being layered with the display unit 110 and detects operational input on an operation screen.

The imaging unit 104 may be a signal converting unit such as a charge coupled device (CCD) or complementary metal oxide semiconductor (CMOS) and forms photographic subjects by an optical system. After the photographic subject is formed by the signal converting unit, the photographic subject is converted into electronic picture signals by the signal converting unit. The imaging unit 104 is controlled by the control unit 100 in accordance with the imaging mode switching operation performed by the user, and outputs image signals of pictures, panorama, or moving pictures. The image signals (captured image) converted by the imaging unit 104 are sent to the display unit 110 or recording media via the signal processing unit 106.

The signal processing unit 106 processes image signals output from the imaging unit 104. The signal processing unit 106 performs, for example, noise reduction, color correction, and edge detection as necessary. The signal processing unit 106 outputs the image signal output from the imaging unit 104 to the display control unit 108 and the recording/reading unit 112.

The display control unit 108 generates screens displayed on the display unit 110 and controls the display of the display unit 110. For example, the display control unit 108 generates display screens and performs display control in accordance with control signals output from the control unit 100. The display control unit 108 also controls the display unit 110 to display captured images output from the signal processing unit 106 and captured images output from the recording/reading unit 112.

The display unit 110 is a display device such as a liquid crystal display (LCD) or organic light emitting diode (OLED), for example. The display unit 110 according to the present embodiment may be used, for example, as a finder to display images in real time during photographing, and may also display captured images recorded to the recording medium 114.

The recording/reading unit 112 records image signals (captured images) output from the signal processing unit 106 to the recording medium 114 in response to the timing when the shutter button is pressed, for example, and reads captured images recorded to the recording medium 114. The recording/reading unit 112 may also compress the captured images before recording them to the recording medium 114. When compressed data is read from the recording medium 114, the data is decompressed before being output to the display control unit 108.

The recording medium 114 is a memory card or other to which captured images are written.

The power supply unit 116 includes a battery and power supply circuit, and switches power on and off in response to a power supply control signal output from the control unit 100. The power supply unit 116 performs the supply of power to the configurations of the imaging apparatus 10.

The time management unit 118 is an example of an obtaining unit to obtain time information, and more specifically, includes a time circuit to manage the date, hour, minute, and second. The time information obtained by the time management unit 118 is added to captured images as a record of the photographed timing, which is then used as the parameter information stored in the storage unit 130 used during the selection of the connection which is described later.

The storage unit 130 is a recording medium such as random access memory (RAM) or read-only memory (ROM). RAM is used as the working region of the control unit 100, for example. A program that the control unit 100 executes for imaging control, signal processing control, recording control, display control, and so on is written to the ROM.

Figure 4:
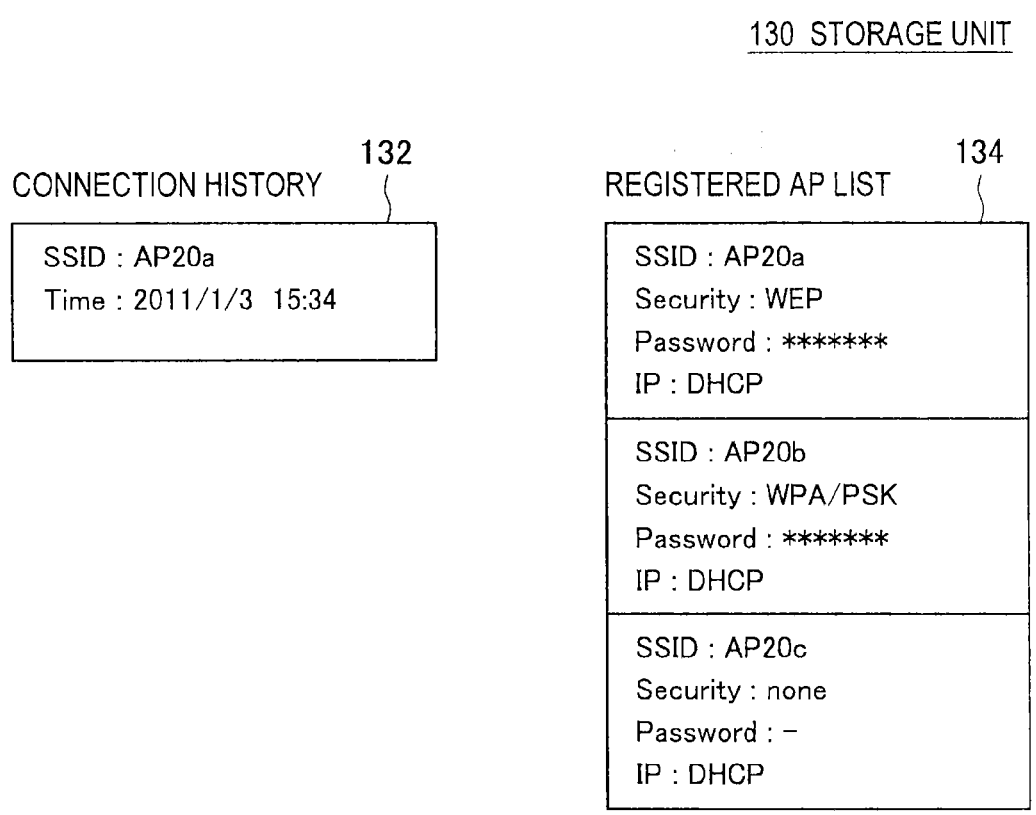
FIG. 4 is a diagram illustrating an example of a connection history and registered AP list according to the First Embodiment.

The storage unit 130 according to the present embodiment stores connecting AP-related information used during the connection selection processing performed by the control unit 100. FIG. 4 illustrates an example of information related to the connecting AP stored by the storage unit 130 according to the present embodiment.

As illustrated in FIG. 4, the storage unit 130 stores a connection history 132 regarding the AP 20 and a registered AP list 134. The connection history 132 includes identification information on the recently connected AP 20 (for example, the service set identifier or SSID) and connection timings (for example, the timing that the connection ended among the timings including the start of the connection to the end of the connection) as the parameter information. The connection history 132 may also include multiple connection histories in order going back in time from the most recent connection history.

The registered AP list 134 is a list of APs for which the user has performed connection settings (registered), and stores settings including the SSID of the AP 20, security method, password, and IP address.

The communication unit 124 is a communication interface for connecting with other communication apparatuses. The communication unit 124 may connect with other communication apparatuses via a wired or wireless connection, but as an example according to the present embodiment, wireless communication is performed with an access point (AP) over Wi-Fi as an example of another wireless communication apparatus. The Wi-Fi connecting AP is selected by the control unit 100 (communication control unit), and the communication unit 124 connects with the predetermined AP in accordance with control by the control unit 100.

This concludes the detailed description of the configuration of the imaging apparatus 10 according to the present embodiment. Next, the selection of the Wi-Fi connecting AP by the control unit 100 of the imaging apparatus 10 according to the present embodiment will be described in detail with reference to FIG. 5 through FIG. 8.

2-1-2. Connection Selection

Figure 5:
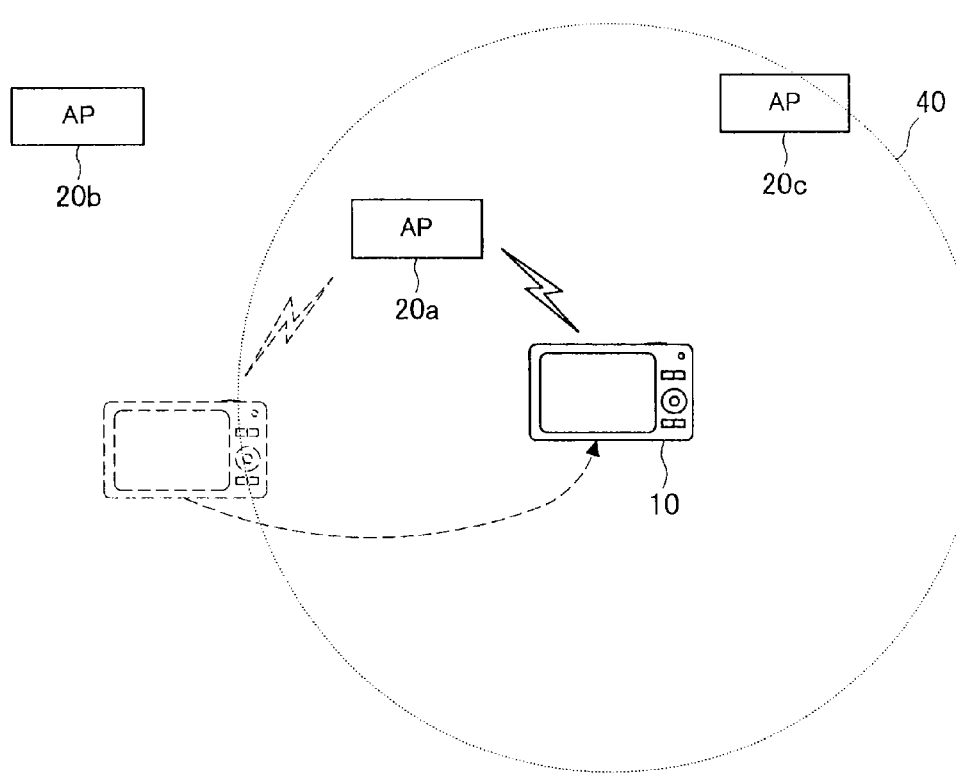
FIG. 5 is a diagram describing a situation when executing a connection selection according to the First Embodiment.

FIG. 5 is a diagram describing a situation when executing the connection selection according to the First Embodiment. As illustrated in FIG. 5, if the imaging apparatus 10 first connects with the AP 20a, and then the operation mode of the imaging apparatus 10 transitions to the imaging mode or other, Wi-Fi turns off, and the connection with the AP 20a is disconnected. At this time, the storage unit 130 of the imaging apparatus 10 stores connection history 132 regarding the AP 20a as illustrated in FIG. 4.

Figure 6:
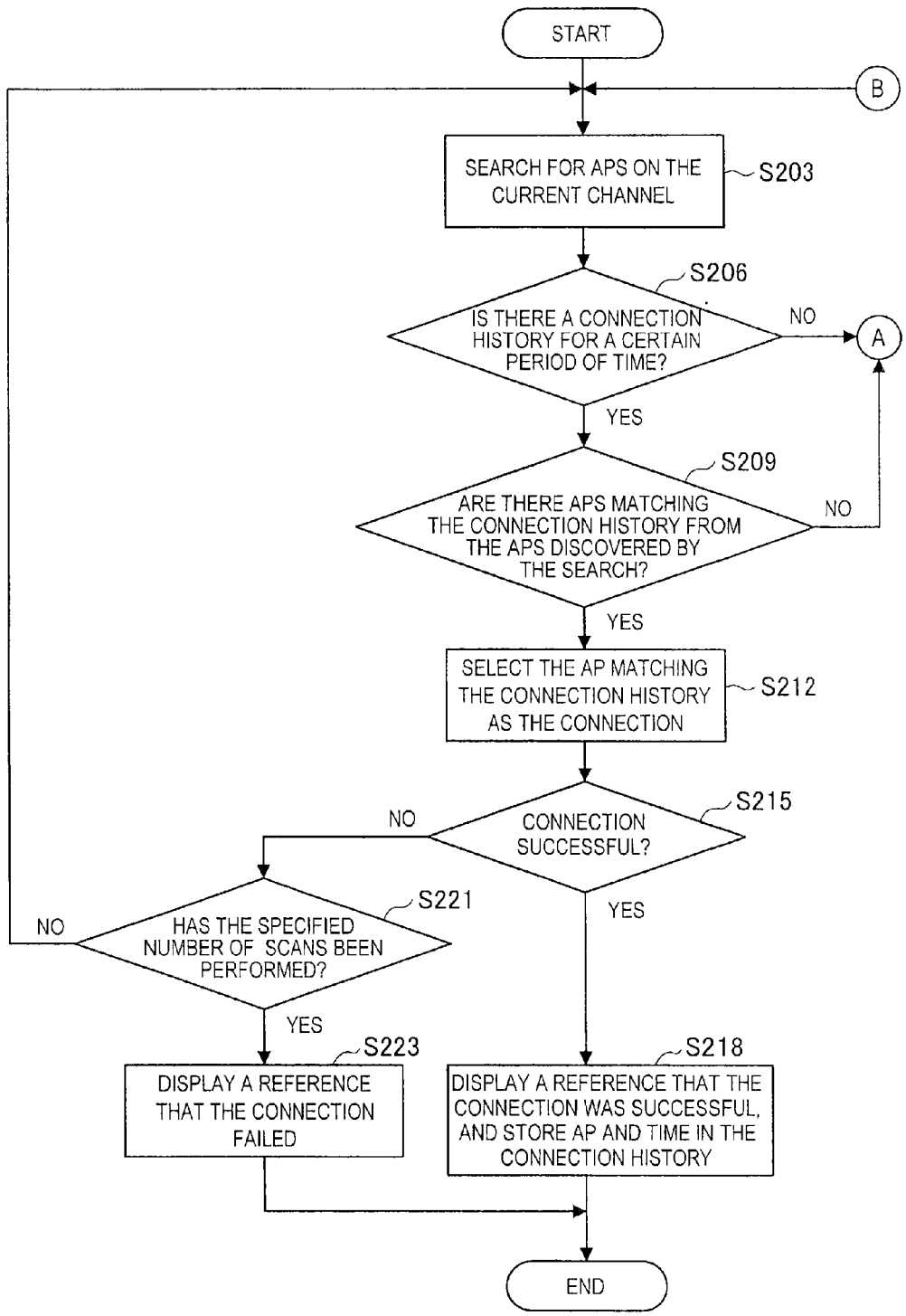
FIG. 6 is a flowchart illustrating a connection selection processing according to the First Embodiment.
Figure 7:
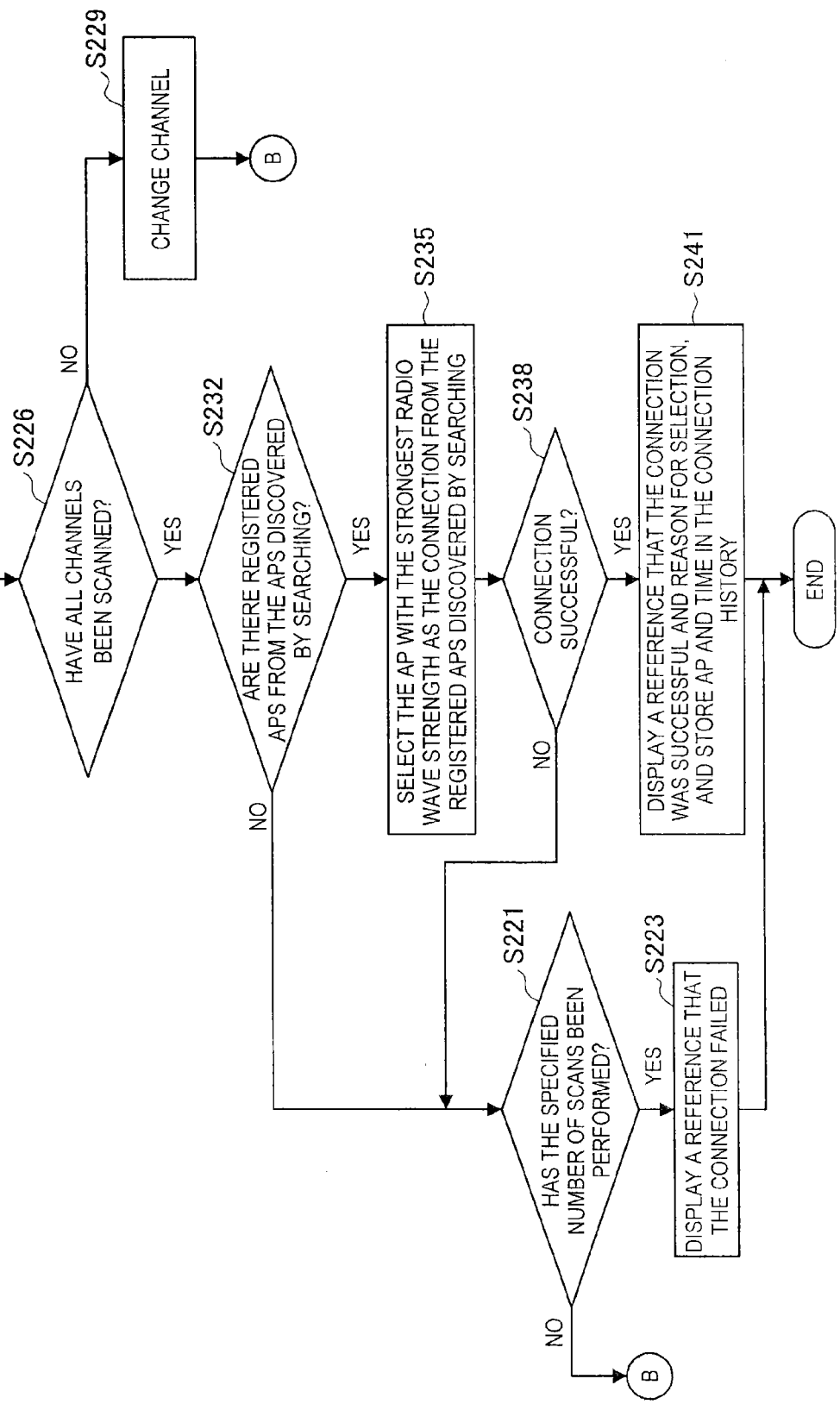
FIG. 7 is a flowchart illustrating a connection selection processing according to the First Embodiment.

After some time elapses and the user travels somewhat while holding the imaging apparatus 10, and then the operation mode of the imaging action 10 transitions to the picture upload mode, Wi-Fi turns on and the connection selection according to the present embodiment is performed. Hereafter, the connection selection processing will be described with reference to FIG. 6 and FIG. 7. FIG. 6 and FIG. 7 are flowcharts illustrating the connection selection processing according to the First Embodiment.

As illustrated in FIG. 6, at step S203, first the control unit 100 (communication control unit) searches for the AP 20 present in the near vicinity on the current channel via the communication unit 124. In the example in FIG. 5, the imaging apparatus 10 discovers the AP 20a and the AP 20b present within a search radius 40.

Next, at step S206, the control unit 100 determines whether or not there is a connection history 132 regarding a certain period of time. According to the First Embodiment, time information (connection timing) is stored in the connection history 132 as parameter information.

The control unit 100 according to the present embodiment prioritizes and selects the AP included in the connection history 132 as the connection when the difference in the time information during the connection with the AP included in the connection history 132 and the current (not connected) time information is equal to or less than a predetermined value.

The predetermined value may be in units of minutes, hours, or similar, may be set by the user, or may be set beforehand.

Next, at step S209, the control unit 100 determines whether or not there is an AP that matches the connection history from the APs 20 discovered by the search.

Next, at step S212, the control unit 100 selects the AP 20 matching the connection history as the connection. In the example illustrated in FIG. 5, the imaging apparatus 10 discovers the AP 20a and the AP 20c by searching. When there is a connection history 132 for the AP 20a as illustrated in FIG. 4, the imaging apparatus 10 prioritizes and selects the AP 20a as the connection between the discovered AP 20a and the AP 20b. In this case, the communication unit 124 performs the connection with the AP 20a.

Next, at step S215, if the connection is successfully made by the communication unit 124, at the next step S218, the display control unit 108 displays a reference that the connection was successfully made on the display unit 110, a new connection history is stored in the storage unit 130, and then the processing ends.

Conversely, if the connection fails at the aforementioned step S215, at step S221, the control unit 100 confirms whether or not the specified number of scans has been performed, and if this specified number has not yet been reached, processing returns to step S203.

Next, when the specified number has been reached, at step S223, the display control unit 108 displays a reference that the connection failed, and then the processing ends.

Next, at the aforementioned step S206, if there was a determination that there is no connection history regarding a certain period of time, and there is no AP matching the connection history at step S209, processing proceeds to step S226 illustrated in the flowchart in FIG. 7.

At step S226 illustrated in FIG. 7, the control unit 100 determines whether or not scans on all channels have completed. If scans on all channels have not yet completed, at step S229, the control unit 100 changes the channel on which the communication unit 124 performs the search. Processing then returns to step S203 illustrated in FIG. 6, and the AP search is performed on the changed channel (current channel).

Figure 8:
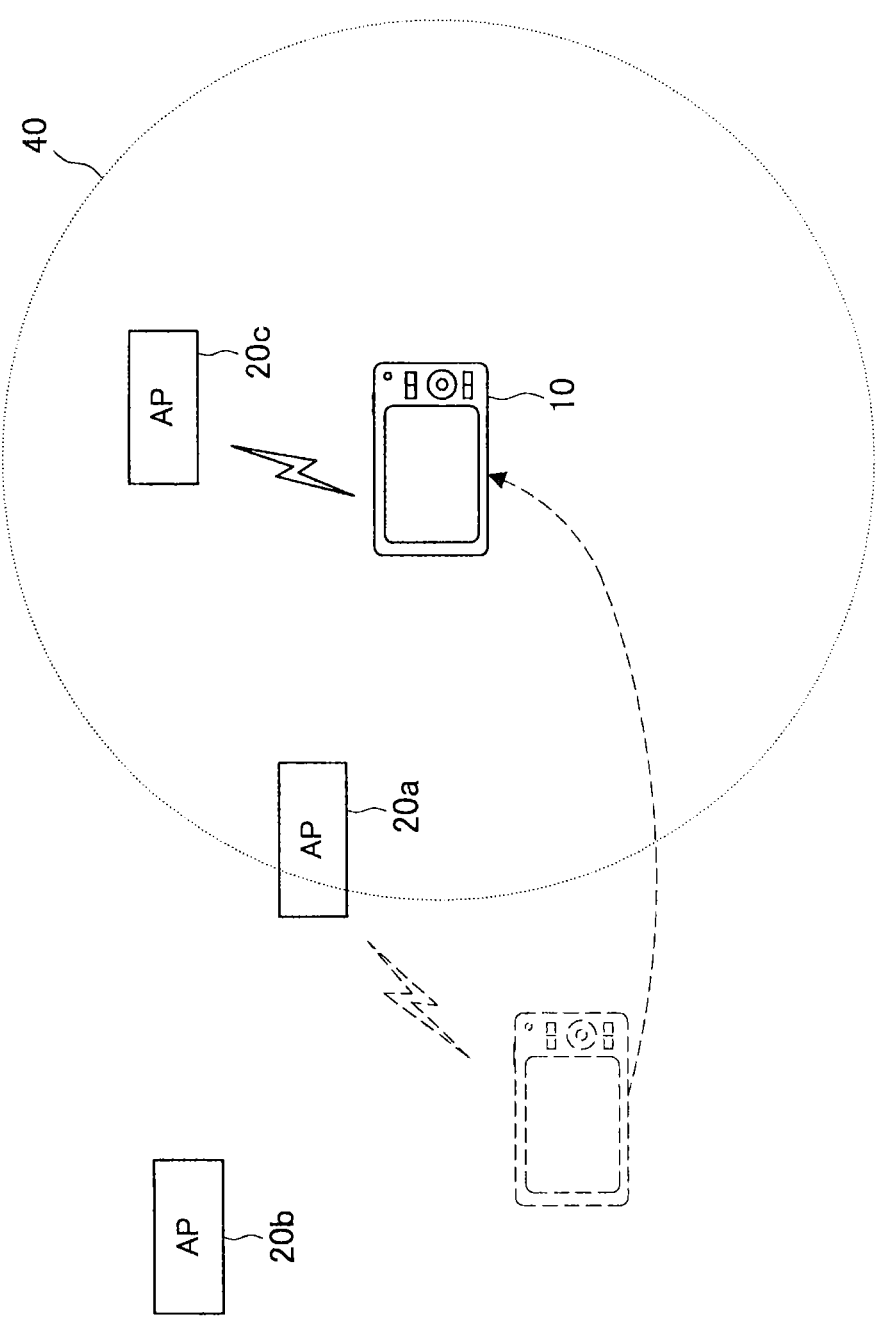
FIG. 8 is a diagram describing a situation when the connection selection is performed according to a Second Embodiment.

Conversely, if there was a determination that scans on all channels are complete, at step S232, the control unit 100 determines whether or not there is a registered AP among the APs discovered by the search. FIG. 8 illustrates a diagram describing the connection selection regarding the case when there is no connection history regarding a certain period of time.

The example illustrated in FIG. 8 references a case in which the Wi-Fi connection is disconnected, and afterwards, an amount of time longer than that regarding the example illustrated in FIG. 5 has elapsed, and the user has traveled a farther distance while holding the imaging apparatus 10. The imaging apparatus 10 discovers the AP 20a and the AP 20c by searching. After referencing the registered AP list 134 as illustrated in FIG. 4 and as the AP 20a and the AP 20c are registered, the imaging apparatus 10 then determines that there are registered APs.

Next, at step S235, the control unit 100 selects the AP with the strongest radio wave strength as the connection among the registered APs discovered by the search. In the example in FIG. 8, if the AP 20c has stronger radio wave strength than the AP 20a, the control unit 100 selects the AP 20c as the connection. As a result, adverse effects from a connection selection based on only a uniform connection in which a connection is not made with the AP having stronger radio wave strength may be prevented.

Next, at step S238, if the connection is successfully made by the communication unit 124, at the next step S241, the display control unit 108 displays a reference that the connection was successfully made and the reason for selection on the display unit 110. The reason for selection is the reason why a different connection from that of the previous connection was selected by the imaging apparatus 10. As a result, the user may confirm the reason why a connection could not be made with the previous AP as desired, which eliminates frustration and stress caused by connections to other APs without any notification regarding the reason. At step S241, the control unit 100 then stores a new connection history in the storage unit 130.

Conversely, if there is a determination that there are no registered APs at the aforementioned step S232, and the connection fails at step S215, processing proceeds to step S221. Step S221 and the following step S223 are similar to the processing of the same reference numerals as illustrated in FIG. 7, and so their description is omitted.

This concludes the description of the First Embodiment according to the present embodiment. As previously described, in the selection of the Wi-Fi connection, the AP 20 included in the connection history is prioritized and selected as the connection when the connection timing with the AP 20 included in the connection history is within a certain time period from the current time. Conversely, when the connection timing with the AP 20 included in the connection history is not within a certain time period from the current time, the AP 20 with the strongest radio wave strength is prioritized and selected as the connection.

In this way, the present embodiment may prevent adverse effects from a connection selection based on only a uniform connection in which a connection is not made with the AP having stronger radio wave strength as it is possible to select the connection on the basis of dynamic criteria. According to the present embodiment, the user also does not have to perform complicated priority settings repeatedly depending on circumstances.

The connection selection according to the present embodiment is particularly effective regarding machines that turn Wi-Fi on/off in accordance with the internal state of the machine as reconnections with the AP occur frequently. Though some machines do not turn Wi-Fi on/off in accordance with the internal state of the machine, other machines automatically turn off the power after a certain amount of time of inactivity. The connection selection according to the present embodiment is effective regarding such machines as reconnections occur frequently when the time of inactivity to turn off the power is a short period of time measured in tens of seconds.

The connection selection according to the present embodiment is particularly effective regarding home networks in which the network is different depending on the connecting AP 20 as it is desired to reconnect with the predetermined AP in most cases.

At step S235 as in FIG. 7, the connection is selected using radio wave strength as the criteria, but the present embodiment is not limited thusly, and other criteria may be used. For example, a previously set static priority, a communication fee schedule, or a communication error ratio and others may be used as the criteria.

2-2. Second Embodiment

According to the previously described First Embodiment, time information is used as an example of the parameter information during the connection with the AP 20 included in the connection history, but the parameter information according to the present disclosure is not limited to time information. For example, the parameter information during the connection with the AP 20 included in the connection history may be positional information. Hereafter, the Second Embodiment in which positional information during the connection with the AP 20 is included in the connection history, in which this positional information is used for the connection selection, will be described with reference to FIG. 9 and FIG. 10.

2-2-1. Configuration of Imaging Apparatus

Figure 9:
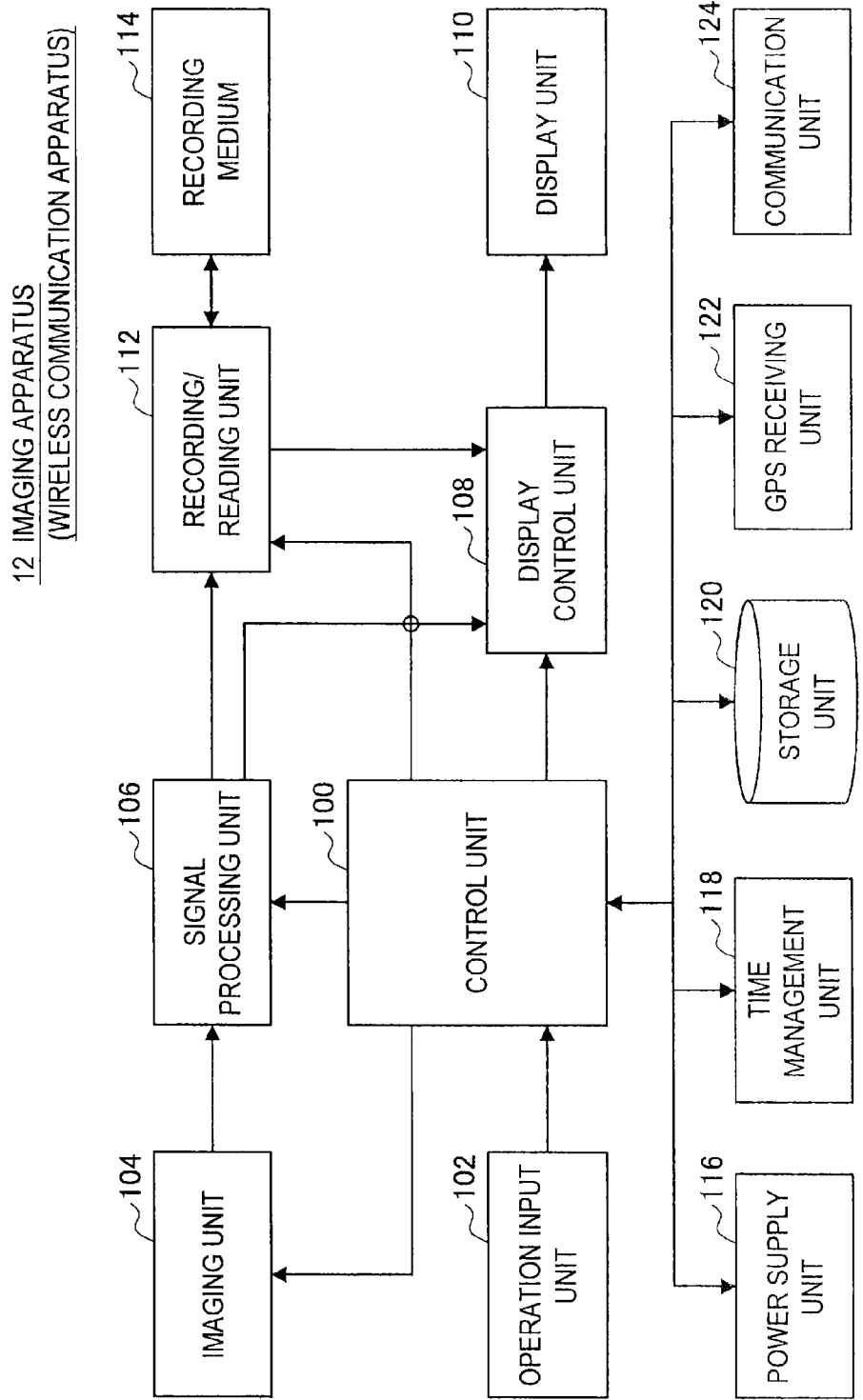
FIG. 9 is a block diagram illustrating a configuration of an imaging apparatus according to the Second Embodiment.

FIG. 9 is a block diagram illustrating a configuration of an imaging apparatus 12 according to the Second Embodiment. As illustrated in FIG. 9, the imaging apparatus 12 according to the present embodiment includes a global positioning system (GPS) receiving unit 122 in addition to the configuration of the imaging apparatus 10 according to the First Embodiment (refer to FIG. 3).

The GPS receiving unit 122 is an example of an obtaining unit for obtaining positional information on the imaging apparatus 12 (the actual apparatus). The GPS receiving unit 122 receives navigation messages sent from three or more satellites, and may calculate the current positioning of the actual apparatus on the basis of the received navigation messages.

The positional information obtained by the GPS receiving unit 122 is added to captured images as a record of the photographing location, which is then stored in the storage unit 130 as parameter information used during the Wi-Fi connection selection. Hereafter, the connection selection according to the Second Embodiment will be described.

2-2-2. Connection Selection

The imaging apparatus 12 according to the present embodiment first stores the positional information of the imaging apparatus 12 regarding the connection time with the AP 20 (for example, the timing that the connection ended among the timings including the start of the connection to the end of the connection) in the connection history 132.

When Wi-Fi turns on again, the connection selection according to the present embodiment is performed. Hereafter, this will be described in detail with reference to FIG. 10.

Figure 10:
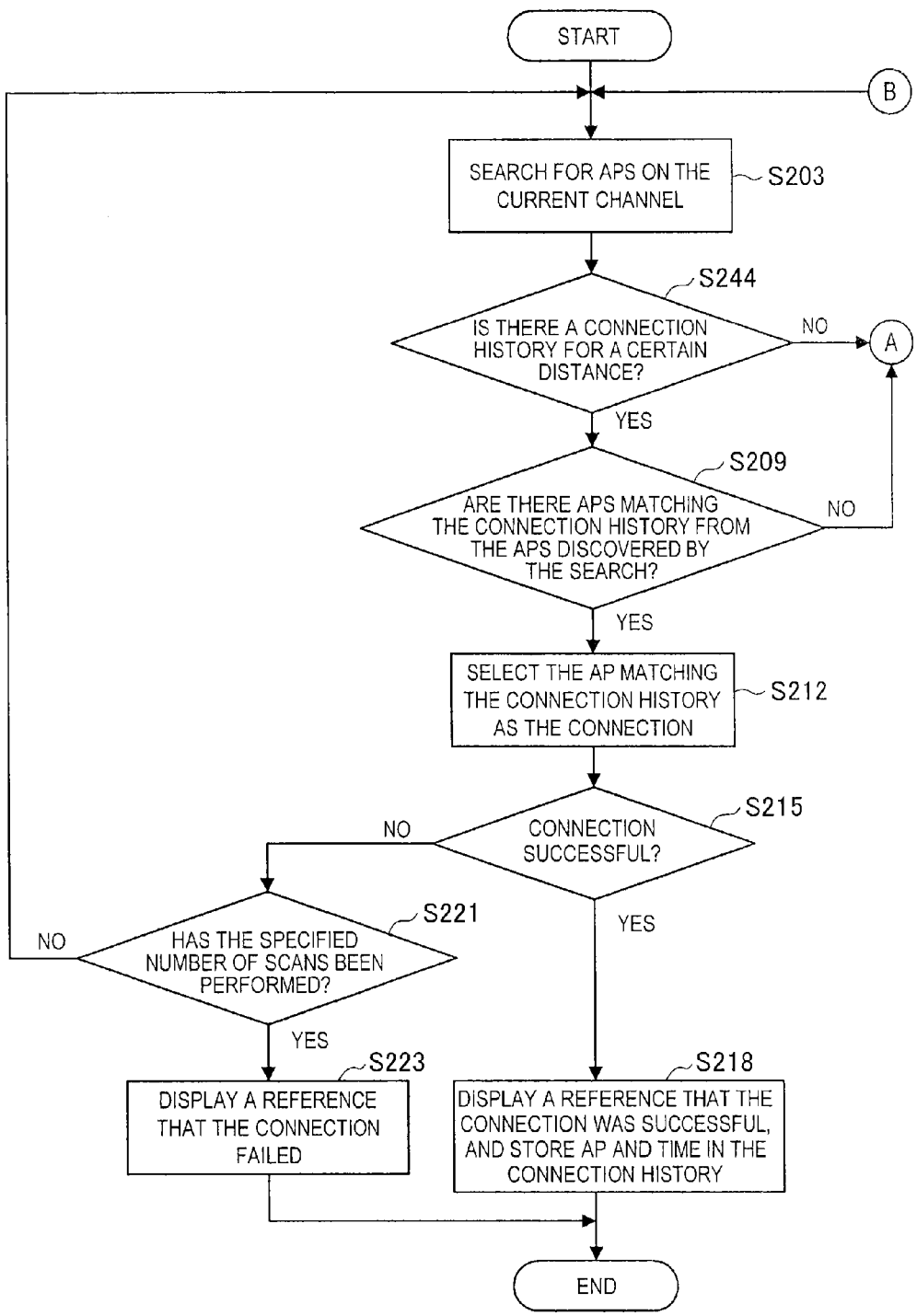
FIG. 10 is a flowchart illustrating the connection selection processing according to the Second Embodiment.

FIG. 10 is a flowchart illustrating the connection selection processing according to the Second Embodiment. The processing illustrated in FIG. 10 that has the same reference numerals as the processing in FIG. 6 illustrating the connection selection processing according to the First Embodiment is similar to that of the previously described First Embodiment, and so its description is omitted here.

At step S244 as in FIG. 10, the control unit 100 determines whether or not there is a connection history 132 within a certain distance (amount of travel). According to the Second Embodiment, positional information on the imaging apparatus 12 (the actual apparatus) is stored in the connection history 132 as parameter information.

The control unit 100 according to the present embodiment prioritizes and selects the AP included in the connection history 132 as the connection when the difference in the positional information of the actual apparatus regarding the connection with the AP included in the connection history 132 and the current (not connected) positional information of the actual apparatus is equal to or less than a predetermined value.

The predetermined value may be in units of meters, may be set by the user, or may be set beforehand.

According to the Second Embodiment as previously described, in the selection of the Wi-Fi connection, the AP 20 included in the connection history is prioritized and selected as the connection when the position of the actual apparatus during a connection with the AP 20 included in the connection history is within a certain distance from the current position. Conversely, when the position of the actual apparatus during the connection with the AP 20 included in the connection history is not within a certain distance from the current position, the AP 20 having the strongest radio wave strength is prioritized and selected as the connection.

3. Summary

As previously described, the imaging apparatus according to the present embodiment may select the connection on the basis of a connection history or other criteria depending on circumstances. As a result, the imaging apparatus according to the present embodiment may reconnect with the previously set AP 20 as desired to the extent possible while preventing reconnections with the AP 20 when communication quality is poor due to changes in circumstances.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, according to the previously described embodiments, the examples described used time information and positional information as parameter information when connected to the AP 20 included in the connection history, but the parameter information obtained by the obtaining unit according to the present disclosure is not limited thusly. The imaging apparatus 10 according to the embodiments of the present disclosure may obtain, for example, received signal strength indication (RSSI), temperature data, humidity data, the number of times power has been turned on/off, remaining amount of battery, and so on as parameter information. When the difference in such parameter information is at or below a predetermined value, the imaging apparatus 10 prioritizes and selects the AP 20 included in the connection history as the connection as it is consequently assumed in such cases that only a short time has elapsed or a short distance has been traveled from the time of the disconnection of the connection.

Specifically, if the imaging apparatus 10 includes a temperature sensor as a parameter information obtaining unit, for example, temperature data obtained during the connection with the AP 20 is included in the connection history. The imaging apparatus 10 then prioritizes and selects the AP included in the connection history 132 as the connection when the difference in the temperature information included in the connection history 132 and the temperature information obtained when not connected is equal to or less than a predetermined value.

The imaging apparatus 10 according to the present embodiment may select the connection on the basis of multiple types of parameter information. More specifically, the AP 20 included in the connection history is prioritized and selected as the connection, for example, when the difference in the positional information is at or below a predetermined value and the difference in the time information is at or below a predetermined value.

Additionally, the present technology may also be configured as below.

(1)

A wireless communication apparatus including:

an obtaining unit configured to obtain parameter information; and a communication control unit configured to prioritize and select another wireless communication apparatus included in a connection history as a connection when a difference between the parameter information during a connection with another wireless communication apparatus included in the connection history and the parameter information obtained by the obtaining unit when not connected to the other wireless communication apparatus is at or less than a predetermined value.

(2)

The wireless communication apparatus according to (1), wherein the obtaining unit obtains time information as the parameter information, and wherein the communication control unit performs the selection of the connection using the time information obtained by the obtaining unit as the parameter information.

(3)

The wireless communication apparatus according to (1) or (2), wherein the obtaining unit obtains positional information as the parameter information, and wherein the communication control unit performs the selection of the connection using the positional information obtained by the obtaining unit as the parameter information.

(4)

The wireless communication apparatus according to any one of (1) to (3), wherein the communication control unit selects the connection in accordance with other criteria when the difference exceeds the predetermined value.

(5)

The wireless communication apparatus according to any one of (1) to (4), further including:

a display control unit configured to generate a display of the reason for the selection of the other wireless communication apparatus when connecting to the other wireless communication apparatus selected by the communication control unit.

(6)

The wireless communication apparatus according to any one of (1) to (5), further including:

a recording unit configured to record the connection history with the other wireless communication apparatuses, wherein the connection history includes parameter information obtained by the obtaining unit during a connection with the other wireless communication apparatus or when disconnected with the other wireless communication apparatus.

(7)

The wireless communication apparatus according to any one of (1) to (6), further including:

an imaging unit; and a communication unit configured to connect with the other wireless communication apparatuses, wherein the connection between the communication unit and the other wireless communication apparatus is disconnected when the imaging unit starts.

(8)

A program for causing a computer to function as:

an obtaining unit configured to obtain parameter information; and a communication control unit configured to prioritize and select another wireless communication apparatus included in a connection history as a connection when a difference between the parameter information during a connection with another wireless communication apparatus included in the connection history and the parameter information obtained by the obtaining unit when not connected to the other wireless communication apparatus is at or less than a predetermined value.

(9)

A communication control method including:

obtaining parameter information; and prioritizing and selecting another wireless communication apparatus included in a connection history as a connection when a difference between the parameter information during a connection with another wireless communication apparatus included in the connection history and the parameter information obtained by an obtaining unit when not connected to the other wireless communication apparatus is at or less than a predetermined value.

REFERENCE SIGNS LIST

10 imaging apparatus
30 network
100 control unit
102 operational input unit
104 imaging unit
106 signal processing unit
108 display control unit
110 display unit
112 recording/reading unit
114 recording medium
116 power supply unit
118 time management unit
122 GPS receiving unit
124 communication unit
130 storage unit
132 connection history
134 registered AP list

The invention claimed is:

1. A first wireless communication apparatus, comprising:
   circuitry configured to:
   obtain parameter information of the first wireless communication apparatus, wherein the parameter information is positional information associated with the first wireless communication apparatus; and
   prioritize and select a second wireless communication apparatus included in a connection history as a connection in an event a difference between a first positional information of the first wireless communication apparatus in an event of a connection with said second wireless communication apparatus included in the connection history and a second positional information of the first wireless communication apparatus obtained in an event of disconnection from said second wireless communication apparatus is equal to or less than a determined distance,
   wherein the difference represents a distance between the first positional information of the first wireless communication apparatus and the second positional information of the first wireless communication apparatus.

2. The first wireless communication apparatus according to claim 1, wherein the circuitry is further configured to obtain time information as the parameter information, and
   wherein the selection of said second wireless communication apparatus is based on the obtained time information.

3. The first wireless communication apparatus according to claim 1, wherein the circuitry is further configured to select, from a plurality of wireless communication apparatuses, said second wireless communication apparatus that has strongest signal strength in the event the difference exceeds the determined distance.

4. The first wireless communication apparatus according to claim 1, wherein the circuitry is further configured to generate a display of a reason for the selection of said second wireless communication apparatus.

5. The first wireless communication apparatus according to claim 1, wherein the circuitry is further configured to record the connection history with a plurality of wireless communication apparatuses,
   wherein the connection history includes the parameter information obtained during the connection with said second wireless communication apparatus or in the event of disconnection from said second wireless communication apparatus.

6. The first wireless communication apparatus according to claim 1, further comprising:
   a camera,
   wherein the connection between the first wireless communication apparatus and said second wireless communication apparatus is disconnected in an event the camera starts image capture.

7. The first wireless communication apparatus according to claim 1, wherein, in the event the difference is greater than the determined distance, the selection of said second wireless communication apparatus is based on signal strength of said second wireless communication apparatus included in the connection history.

8. A non-transitory computer-readable medium having stored thereon, a set of computer-executable instructions, for causing a computer to execute operations, comprising:
   obtaining parameter information of a first wireless communication apparatus, wherein the parameter information is positional information associated with the first wireless communication apparatus; and
   prioritizing and selecting a second wireless communication apparatus included in a connection history as a connection in an event a difference between a first positional information of the first wireless communication apparatus during a connection with said second wireless communication apparatus included in the connection history and a second positional information of the first wireless communication apparatus obtained in an event of disconnection from said second wireless communication apparatus is equal to or less than a determined distance, wherein the difference represents a distance between the first positional information of the first wireless communication apparatus and the second positional information of the first wireless communication apparatus.

9. A communication control method, comprising:

obtaining parameter information of a first wireless communication apparatus, wherein the parameter information is positional information associated the first wireless communication apparatus; and prioritizing and selecting a second wireless communication apparatus included in a connection history as a connection in an event a difference between a first positional information of the first wireless communication apparatus during a connection with said second wireless communication apparatus included in the connection history and a second positional information of the first wireless communication apparatus in an event of disconnection from said second wireless communication apparatus is equal to or less than a determined distance, wherein the difference represents a distance between the first positional information of the first wireless communication apparatus and the second positional information of the first wireless communication apparatus.

* * * * *